(12) United States Patent
Bentz et al.

(10) Patent No.: US 11,320,160 B2
(45) Date of Patent: May 3, 2022

(54) MOBILE AIR CONDITIONING UNIT (71) Applicant: Johnson Controls Technology Company, Auburn Hills, MI (US)

(72) Inventors: Jedidiah O. Bentz, Wichita, KS (US); Shaun B. Atchison, Wichita, KS (US); Aneek M. Noor, Wichita, KS (US); Drew H. Carlton, Wichita, KS (US); John W. Uerkvitz, Valley Center, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 222 days.

(21) Appl. No.: 16/215,274

(22) Filed: Dec. 10, 2018

(65) Prior Publication Data
US 2020/0166229 A1 May 28, 2020

Related U.S. Application Data (60) Provisional application No. 62/772,468, filed on Nov. 28, 2018.

(51) Int. Cl.
| | | |
|---|---|---|
| *F24F 11/30* | (2018.01) | |
| *F25B 3/00* | (2006.01) | |
| *F24F 11/65* | (2018.01) | |
| *F24F 140/60* | (2018.01) | |
| *F24F 110/10* | (2018.01) | |
| *F24F 120/10* | (2018.01) | |

(52) U.S. Cl.
CPC ............. *F24F 11/30* (2018.01); *F24F 11/65* (2018.01); *F25B 3/00* (2013.01); *F24F 2110/10* (2018.01); *F24F 2120/10* (2018.01); *F24F 2140/60* (2018.01); *F25B 2600/00* (2013.01)

(58) Field of Classification Search
CPC .. F24F 5/0007; F24F 2120/12; F24F 2140/20; F24F 2221/125; F24F 2005/0025; F24F 11/30; F24F 11/65; F24F 2120/10; F24F 2140/60; F24F 2110/10; F25D 3/06
See application file for complete search history.

(56) References Cited

U.S. PATENT DOCUMENTS

| | | |
|---|---|---|
| 6,279,333 B1 | 8/2001 | Cilli et al. |
| 7,114,555 B2 | 10/2006 | Patel et al. |
| 7,366,588 B2 | 4/2008 | Kim et al. |
| 8,117,864 B2 | 2/2012 | Montminy et al. |
| 8,985,557 B2 | 3/2015 | Canipe et al. |
| 9,612,029 B2 | 4/2017 | Ng |
| 9,964,317 B2 | 5/2018 | Chang |
| 10,264,714 B1 * | 4/2019 | Dolan ................ H05K 7/20745 |
| 2003/0131985 A1 | 7/2003 | Patterson et al. |

(Continued)

FOREIGN PATENT DOCUMENTS

| | | |
|---|---|---|
| EP | 3415828 A1 | 12/2018 |
| WO | 2019139285 A1 | 7/2019 |

*Primary Examiner* — Elizabeth J Martin
(74) *Attorney, Agent, or Firm* — Fletcher Yoder, P.C.

(57) ABSTRACT

A heating, ventilation, and/or air conditioning (HVAC) system includes a mobile air conditioning unit configured to separately dock with each docking station of a plurality of docking stations. The mobile air conditioning unit includes a refrigerant circuit configured to condition an airflow to produce a conditioned airflow and a transportation system configured to autonomously relocate the mobile air conditioning unit.

10 Claims, 7 Drawing Sheets

(56) References Cited

U.S. PATENT DOCUMENTS

| | | |
|---|---|---|
| 2006/0064204 A1* | 3/2006 | Kim .................... F24F 11/30 |
| | | 700/276 |
| 2006/0155421 A1* | 7/2006 | Baek ................. G05D 1/0225 |
| | | 700/276 |
| 2008/0078196 A1 | 4/2008 | Chen et al. |
| 2010/0170275 A1* | 7/2010 | Konrad ................ F25D 17/06 |
| | | 62/259.1 |
| 2015/0267929 A1 | 9/2015 | Kim et al. |
| 2017/0045241 A1 | 2/2017 | Chiu |
| 2017/0167803 A1* | 6/2017 | Fuse ................. B60H 1/00314 |
| 2019/0072293 A1* | 3/2019 | Kim ................. H04M 1/72412 |
| 2019/0120518 A1 | 4/2019 | Kim et al. |
| 2019/0187717 A1* | 6/2019 | He ...................... A47L 9/2852 |

* cited by examiner

MOBILE AIR CONDITIONING UNIT

CROSS REFERENCE TO RELATED APPLICATIONS

This application claims priority from and the benefit of U.S. Provisional Application Ser. No. 62/772,468, entitled "MOBILE AIR CONDITIONING UNIT," filed Nov. 28, 2018, which is hereby incorporated by reference in its entirety for all purposes.

BACKGROUND

The present disclosure relates generally to heating, ventilation, and/or air conditioning (HVAC) systems and, more specifically, to mobile air conditioning systems.

A wide range of applications exist for HVAC systems. For example, residential, light commercial, commercial, and industrial HVAC systems are used to control temperatures and air quality in residences and other buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, or steam or hot water coils. Similar systems are used for vehicle cooling, and as well as for other types of general refrigeration, such as refrigerators, freezers, and chillers.

In some cases, air conditioning and/or heating may be provided by equipment that is not part of a central heating and/or air conditioning system. For instance, window or wall air conditioning units may be utilized to provide conditioned air to specific rooms or areas within a building. Likewise, space heaters may be employed to provide heated air to specific areas within the building. However, by employing separate units for areas of a building to which heated and/or cooled air is desired, the units may not be able to communicate with one another or provide conditioned air as effectively or efficiently as buildings having centralized heating and cooling systems. Moreover, standalone units are typically unable to move themselves to areas of a building that should be heated or cooled.

SUMMARY

The present disclosure relates to a heating, ventilation, and/or air conditioning (HVAC) system that includes a mobile air conditioning unit configured to separately dock with each docking station of a plurality of docking stations. The mobile air conditioning unit includes a refrigerant circuit configured to condition an airflow to produce a conditioned airflow and a transportation system configured to autonomously relocate the mobile air conditioning unit.

The present disclosure also relates to a mobile heating, ventilation, and/or air conditioning (HVAC) unit configured to dock with a docking station of a plurality of docking stations. The mobile HVAC unit includes a drive system configured to move the mobile HVAC unit, processing circuitry configured to control operation of the drive system, and a refrigerant circuit configured condition an airflow within the mobile HVAC unit to produce a conditioned airflow.

The present disclosure further relates to a controller for a heating, ventilation, and/or air conditioning (HVAC) system. The controller is configured to operate a transportation system of an HVAC unit to move the HVAC unit into a docking relationship with a docking station of a plurality of docking stations. Each docking station of the plurality of docking stations is positioned within a conditioned space. Additionally, the controller is configured to operate a refrigerant circuit of the HVAC unit to condition an air flow to generate conditioned air for the conditioned space.

DETAILED DESCRIPTION

The present disclosure is directed to a mobile air conditioning unit, which is referred to herein as a mobile unit. The mobile unit may autonomously move or relocate throughout a space, such as a building or residence, to supply conditioned air, such as heated or cooled air, to the space. As described below in detail, the mobile unit may supply conditioned air while docked at a docking station or while undocked from the docking station. While docked at a docking station, the mobile unit may be charged with additional electrical power, may release heat stored by a waste heat system of the mobile unit, and/or may release condensate that is stored within a drainage system of the mobile unit. The mobile unit may be utilized to provide conditioned air to spaces that do not include built-in heating, ventilation, and/or air conditioning (HVAC) systems.

Figure 1:
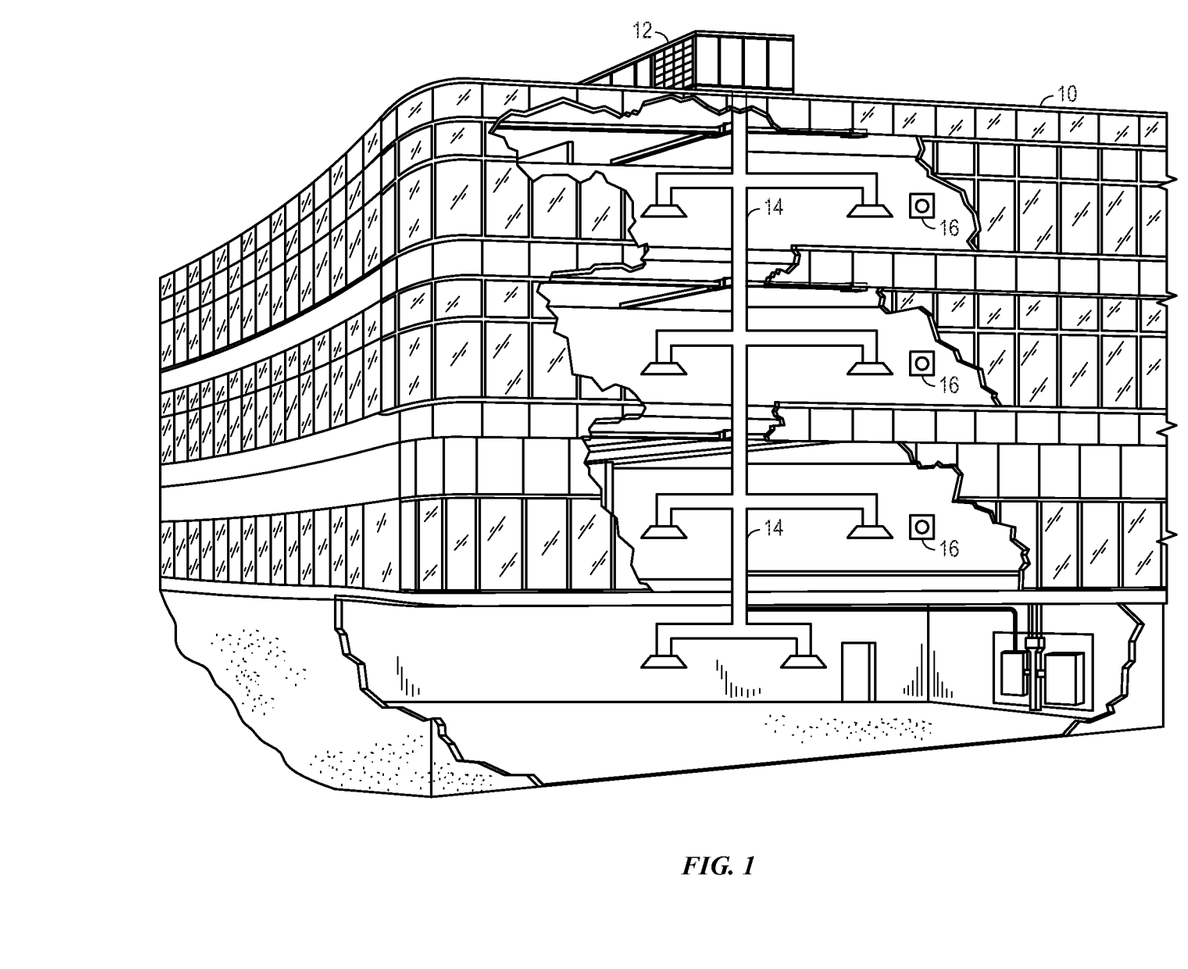
FIG. 1 is a perspective view of an embodiment of a heating, ventilation, and/or air conditioning (HVAC) system for building environmental management, in accordance with aspects of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
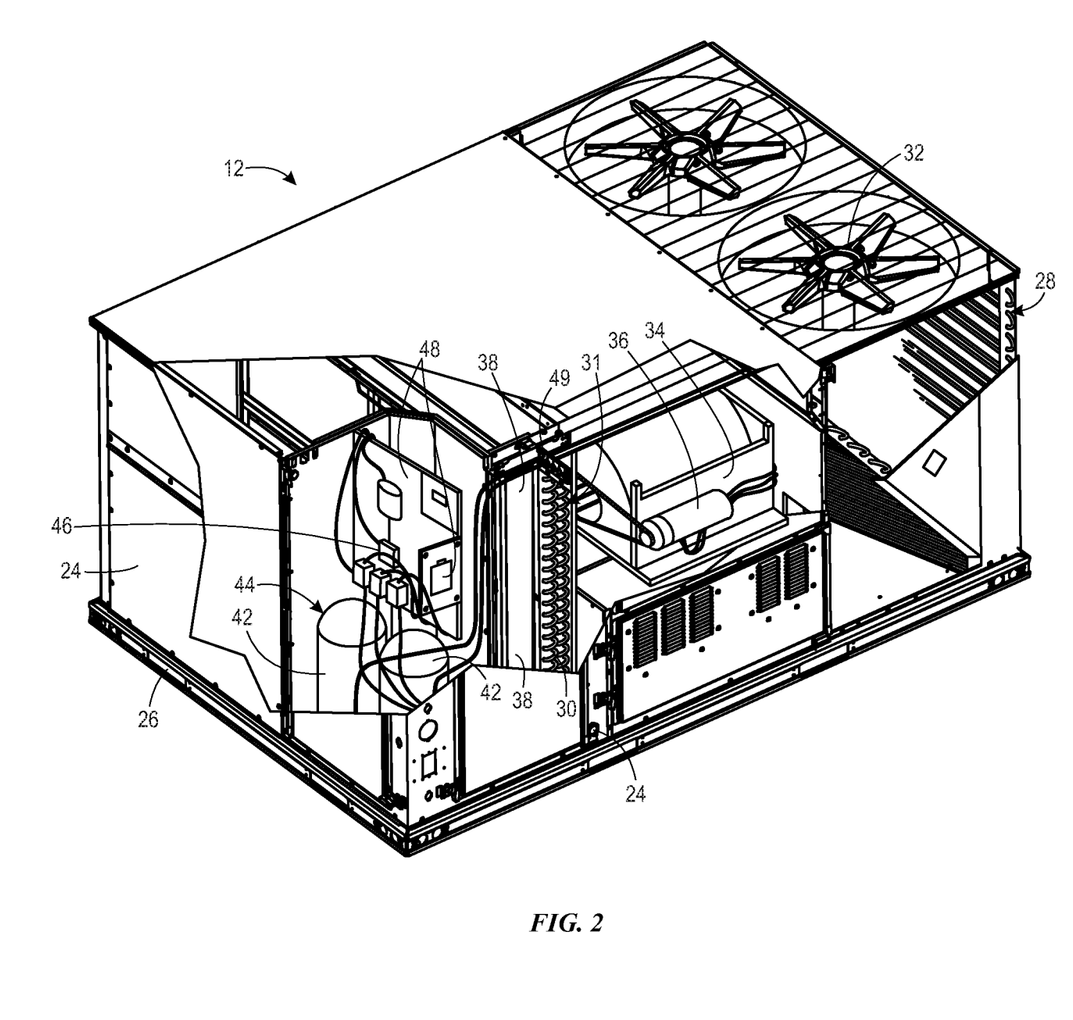
FIG. 2 is a perspective view of an embodiment of a packaged HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
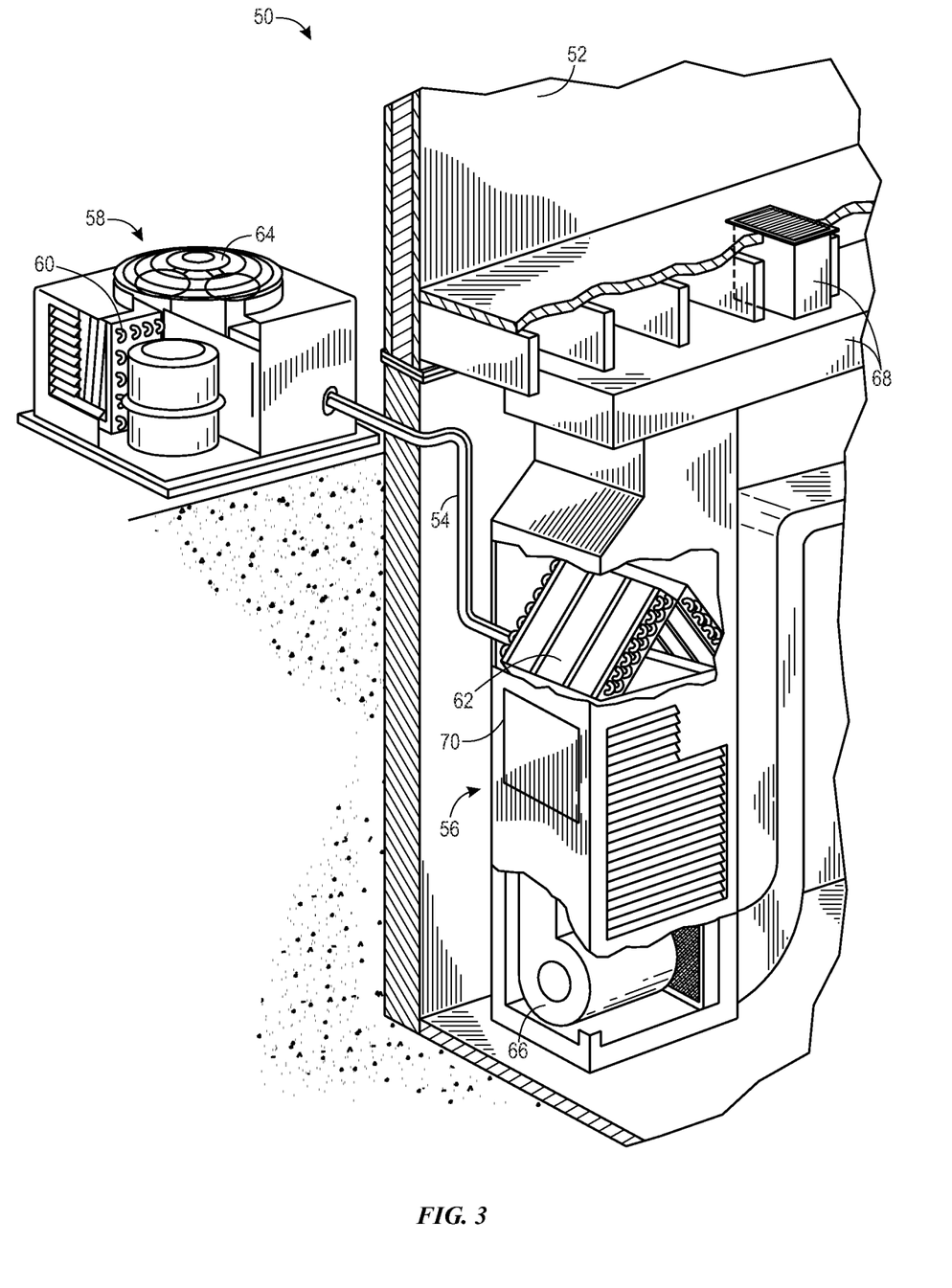
FIG. 3 is a perspective view of an embodiment of a split, residential HVAC system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
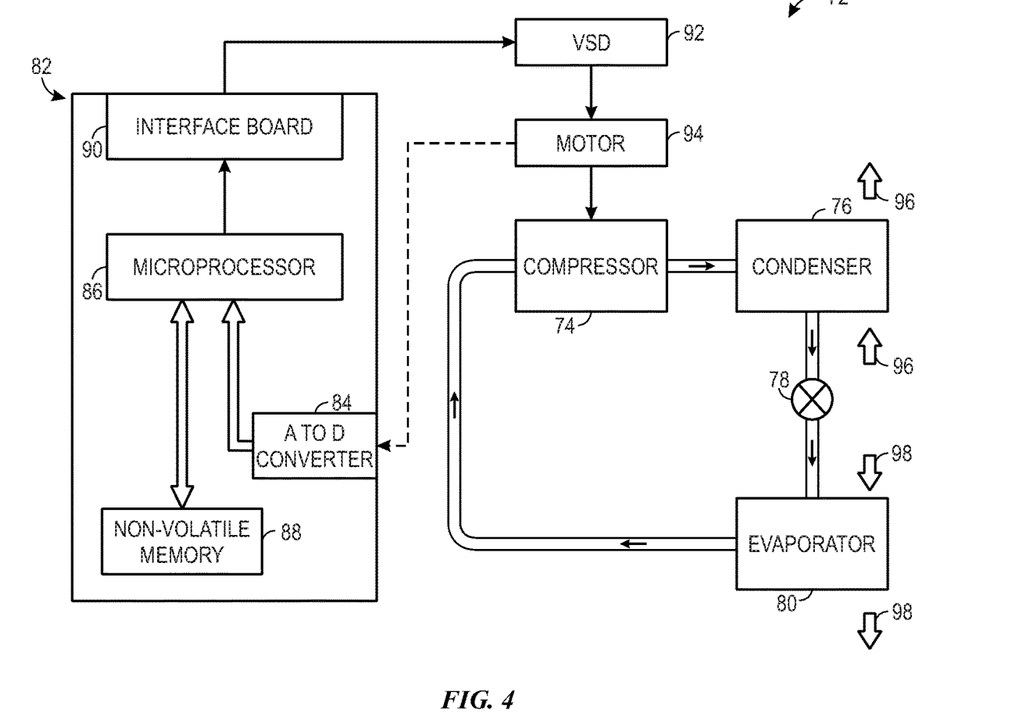
FIG. 4 is a schematic diagram of an embodiment of a vapor compression system that may be used in the HVAC systems of FIGS. 2 and 3, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, HVAC systems may include a mobile unit that can move throughout a space, such as the interior of a building, to provide conditioned air to the space within building. In particular, the mobile unit may provide heating, cooling, and/or air conditioning, and the mobile unit may move between docking stations throughout the building or a portion thereof. The mobile unit may include a transportation system that enables the mobile unit to autonomously navigate or move based on onboard control features and/or instructions received from off board features, such as docking stations. As additionally discussed below, the mobile unit may be configured to communicate with the docking stations to determine which part of the building should be provided with heated or cooled air, to move to the determined location, and to provide conditioned air to the determined location. Indeed, in some cases, the mobile unit may provide conditioned air while not docked at a docking station. Moreover, as described below, the mobile unit may store condensate and waste heat, such as hot air, that are generated during operation of the mobile unit and may expel the condensate and waste heat via vents or ports of the docking stations. Additionally, when docked at a docking station, the mobile unit may electrically charge via a power source provided by the docking stations. Accordingly, the techniques disclosed below enable mobile HVAC units to provide heating and/or cooling as desired throughout a conditioned space without utilizing a centralized heating and/or cooling system.

Figure 5:
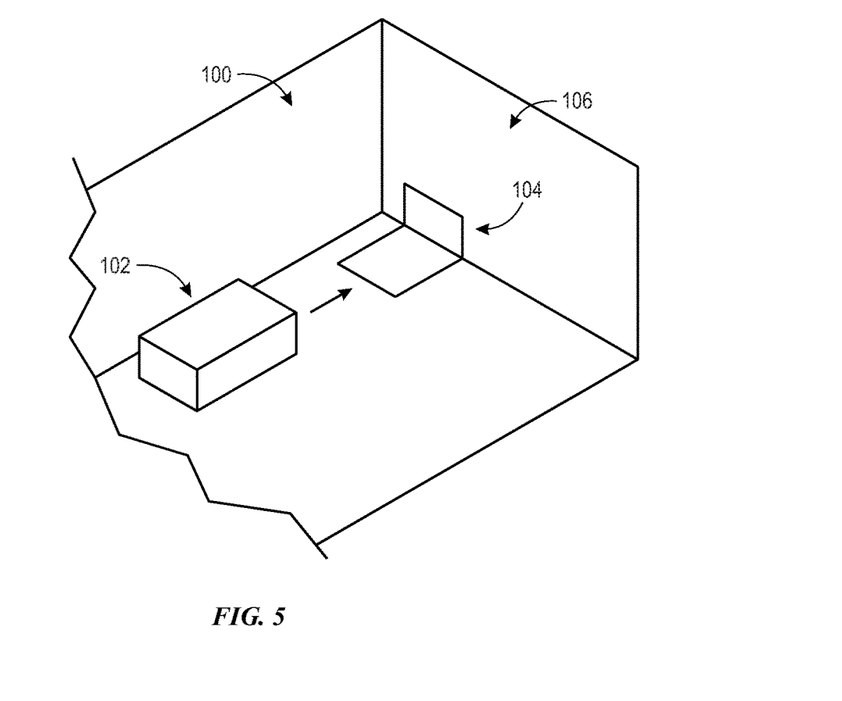
FIG. 5 is a perspective view of an HVAC system that includes a mobile unit and a docking station, in accordance with aspects of the present disclosure.

Continuing with the drawings, FIG. 5 illustrates a perspective view of an HVAC system 100 that includes a mobile unit 102 and a docking station 104. In operation, and as discussed below in relation to FIG. 6 and FIG. 7, the mobile unit 102 includes heating, ventilation, and/or air conditioning equipment that is utilized to supply heated and/or cooled air to a conditioned space 106, such as the interior of a building, in which the mobile unit 102 operates. For example, in some embodiments, the HVAC system 100 may be employed in residential settings, such as homes and dwellings. However, in other embodiments, the HVAC system 100 may be implemented in other types of conditioned spaces, such as commercial and/or industrial buildings. In general, the HVAC system 100 may include several docking stations 104, and the mobile unit 102 may move from docking station 104 to docking station 104 to supply conditioned air to an area associated with a particular docking station 104. More particularly, in some embodiments, the mobile unit 102 may provide conditioned air while docked at the docking station 104, while in other embodiments, the mobile unit 102 may provide conditioned air while undocked. In other words, the mobile unit 102 may provide heated and/or cooled air while not docked at the docking station 104.

Figure 6:
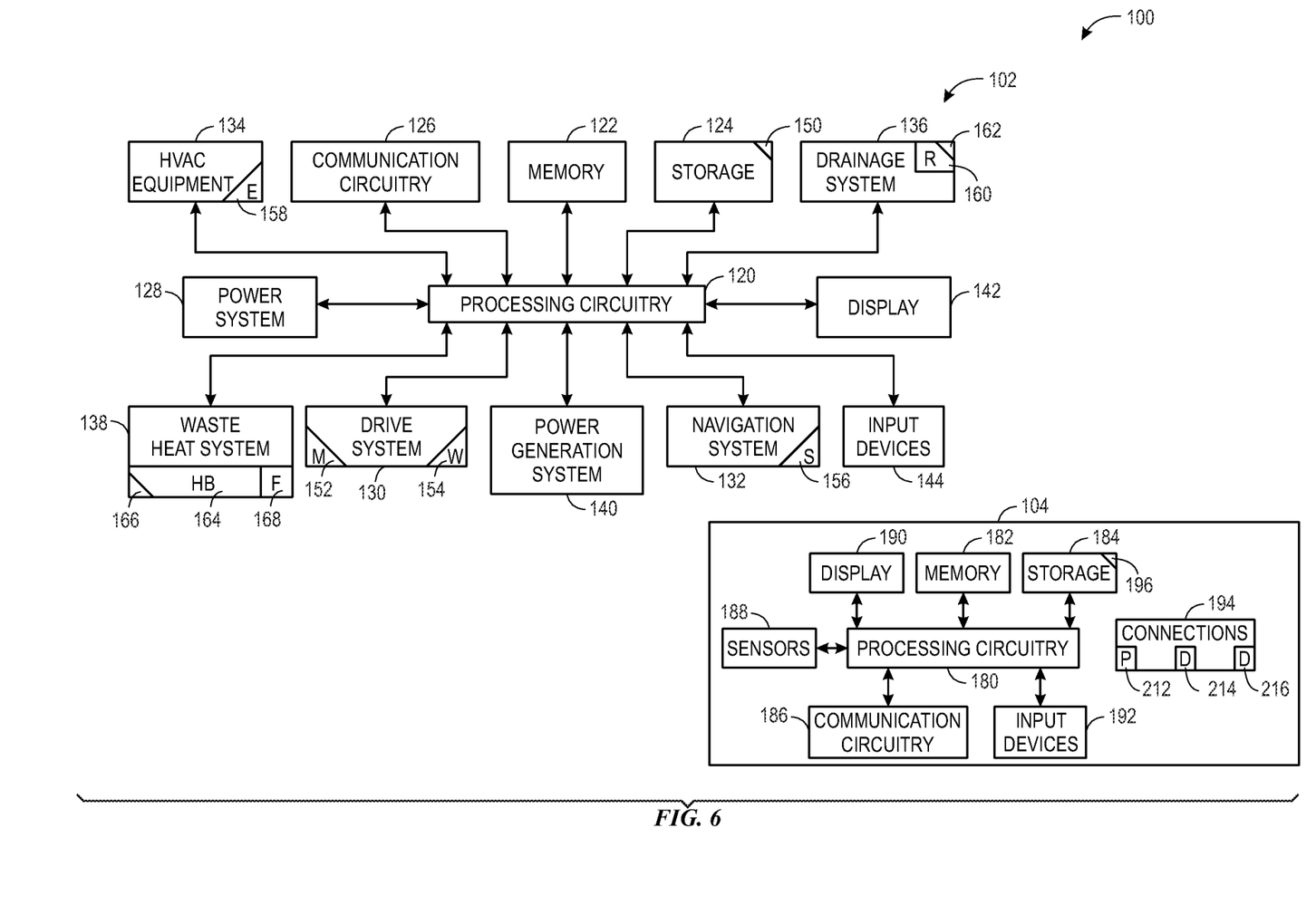
FIG. 6 is a schematic view of an embodiment of the mobile unit and an embodiment of the docking station of FIG. 5, in accordance with aspects of the present disclosure.

Bearing this in mind, FIG. 6 is a schematic diagram of the mobile unit 102. In the depicted embodiments, the mobile unit 102 includes processing circuitry 120, memory 122, storage 124, communication circuitry 126, a power system 128, a transportation or drive system 130, a navigation system 132, heating, ventilation, and air conditioning (HVAC) equipment 134, a drainage system 136, a waste heat system 138, a power generation system 140, a display 142, and input devices 144. The various components described in FIG. 6 may include hardware elements, such as circuitry, software elements, such as a tangible, non-transitory computer-readable medium storing instructions, or a combination of both hardware and software elements. It should be noted that the various depicted components may be combined into fewer components or separated into additional components. For example, the memory 122 and the storage 124 may be included in a single component. Moreover, in addition to the processing circuitry 120, various components of the mobile unit 102 may include their own processing circuitry. For example, the navigation system 132 may include one or more processors.

As depicted, the processing circuitry 120 is operably coupled with the memory 122 and the storage 124. Thus, the processing circuitry 120 may execute instructions stored in the memory 122 and/or the storage 124 to perform autonomous operations, such as controlling movement of the mobile unit 102, as well as heating and cooling operations performed via the HVAC equipment 134. As such, the processing circuitry 120, which may be referred to as a central controller, may include one or more general purpose microprocessors, one or more application specific integrated circuits (ASICs), one or more field programmable logic arrays (FPGAs), or any combination thereof. The instructions on the storage 124 that the processing circuitry 120 may execute may include an application 150 that enables to the processing circuitry 120 to perform functions described below. For example, the application 150 may be executed to control the movement of the mobile unit 102 as well as operations performed by the mobile unit 102.

In addition to instructions, the memory 122 and/or the storage 124 may store data to be processed by the processing circuitry 120. Thus, in some embodiments, the memory 122 and/or the storage 124 may include one or more tangible, non-transitory, computer-readable mediums. For example, the memory 122 may include random access memory (RAM), and the main memory storage 124 may include read only memory (ROM), rewritable non-volatile memory such as flash memory, hard drives, optical discs, and/or the like.

As depicted, the processing circuitry 120 is also operably coupled with the communication circuitry 126. In some embodiments, the communication circuitry 126 may facilitate data communication with another electronic device and/or a communication network. For example, the communication circuitry 126, which may be a radio frequency system, may enable the mobile unit 102 to communicatively couple to a personal area network (PAN), such as a Bluetooth network, or a local area network (LAN), such as an 802.11x Wi-Fi network. Additionally, the communication circuitry 126 may enable the mobile unit 102 to communicatively couple to docking stations 104, as well as users' electronic devices, such as mobile phones, tablets, or computers.

Additionally, as depicted, the processing circuitry 120 is operably coupled to the power system 128. In some embodiments, the power system 128 may provide electrical power to one or more components in the mobile unit 102, such as the processing circuitry 120 and each of the other illustrated components of the mobile unit 102. Thus, the power system 128 may include any suitable source of energy, such as one or more rechargeable batteries. For instance, the power system 128 may include one or more lead-based, nickel-based, or lithium-based rechargeable batteries, or a combination thereof. For instance, lead-based batteries may include lead-acid batteries, nickel-based batteries may include nickel-hydrogen (NiH), nickel-metal-hydride (NiMH), nickel-zinc (NiZn), nickel-cadmium (NiCd), and nickel-iron (NiFe) batteries, and lithium-based batteries may include lithium-ion and lithium-polymer batteries.

During operation of the mobile unit 102, power supplied by the power system 128 may be utilized as the power source of the mobile unit 102. For instance, when the mobile unit 102 is disconnected from the docking stations 104, the power system 128 may be used to provide power to the mobile unit 102 and any components thereof. For instance, the drive system 130, which enables the mobile unit 102 to move, may be driven by a motor that is supplied with electrical power via the power system 128. As another example, the power system 128 may provide power to the HVAC equipment 134, which enables the HVAC equipment 134 to operate while the mobile unit 102 is disconnected from the docking stations 104. Additionally, it should be noted that when the mobile unit 102 is docked at one of the docking stations 104, the power system 128 may be recharged. For example, as discussed below, docking stations 104 may include a power source to which power system 128 may couple, and the power system 128 may receive electrical power from the power source. As also discussed below, the power system 128 may be recharged via the power generation system 140, for example, when the mobile unit 102 is disconnected from the docking stations 104.

As also illustrated in FIG. 6, the processing circuitry 120 is operably coupled to the drive system 130, which provides movement to the mobile unit 102. Using the drive system 130, the mobile unit 102 is able to autonomously navigate based on instructions. In particular, the drive system 130 may include one or more motors 152 that are powered by the power system 128 and drive one or more rollers, wheels 154, caterpillar tracks, or other propulsion elements of the mobile unit 102. For example, the wheels 154 may include tires that can be driven by the motor 152 to move the mobile unit 102 across various flooring surfaces that may be included in the conditioned space 106, such as tile, carpet, vinyl, wood, stone, and other types of flooring surfaces. For example, the tires may include tread that includes lugs and/or voids that enable the tires to more effectively grip the flooring surfaces. In an embodiment, the wheels 154 may include tires that have protrusions that aid the tire in gripping flooring surfaces. As mentioned above, in other embodiments, the mobile unit 102 may employ other propulsion features instead of, or in addition to, the wheels 154. For example, the mobile unit 102 may include a continuous track system, such as caterpillar tracks. In other words, the drive system 130 may include one or more continuous bands of treads that are driven by two or more wheels that are powered by the motor(s) 152.

The navigation system 132, which may also be operatively coupled to the processing circuitry 120, enables the mobile unit 102 to determine its location within the conditioned space 106, detect and avoid obstructions, and park at docking stations 104. In particular, the navigation system 132 may include sensors 156 that collect data that may be processed by the processing circuitry 120 to determine a location of the mobile unit 102 and/or to determine how the drive system 130 is controlled. For instance, the sensors 156 may include proximity sensors, such as infrared proximity sensors, that can be utilized to locate docking stations 104, as well as detect the presence of objects and occupants in the conditioned space 106, such as fixtures, furniture, people and/or animals. The sensors 156 may also include contact sensors 156 which may be positioned around a perimeter of a base of the mobile unit 102 to detect when the mobile unit 102 physically contacts an object, such as an article of furniture. Additionally, the sensors 156 may include one or more light sensors that may be utilized to detect a height differential. For instance, the light sensors may positioned on the base of the mobile unit 102, and the processing circuitry 120 may utilize data from the light sensors to determine that the mobile unit 102 is positioned proximate to stairs.

Furthermore, the processing circuitry 120 may use the sensors 156 of the navigation system 132 to map the conditioned space 106. For example, as the mobile unit 102 moves within the conditioned space 106, the processing circuitry 120 may utilize data from the sensors 156 to determine where walls, furniture, and other impediments are located within the conditioned space 106. Additionally, the processing circuitry 120 may utilize the map in conjunction with data from the sensors 156 to control the movements of the mobile unit 102 throughout the conditioned space 106. In some embodiments, the mobile unit 102 may utilize data from the sensors 156 to generate a map of the conditioned space 106 that may be stored in the storage 124 for future use or reference by the mobile unit 102.

The HVAC equipment 134 of the mobile unit 102 operates to provide conditioned air to the conditioned space 106. More specifically, the HVAC equipment 134 may include components such as those discussed above with respect to FIGS. 2-4 above. Indeed, as discussed below, the HVAC equipment 134 includes a refrigerant circuit and associated components that are configured to intake air, condition the air, and provide the conditioned air to the conditioned space 106. For example, the mobile unit 102 may receive data from the docking station 104, from a controller within the conditioned space 106, such as a thermostat, or another electronic device indicating target temperature and/or climate settings for the conditioned space 106. The mobile unit 102 may utilize the HVAC equipment 134 to provide conditioned air in accordance with the target settings.

During operation of the HVAC equipment 134, liquid water may form. For example, condensation may occur on or nearby the coils of an evaporator 158 of the HVAC equipment 134. The drainage system 136 may include a tank or reservoir 160 for collecting water that may accumulate within the mobile unit 102. The reservoir 160 may also include one or more level sensors 162 that detect the level of liquid within the reservoir 160. The processing circuitry 120 may receive data and/signals from the level sensors 162 to determine the level of liquid within the reservoir 160. When the processing circuitry 120 determines that the level of liquid or condensate reaches a threshold value, such as a predetermined level associated with one of the level sensors 162, the processing circuitry 120 may regulate operation of the mobile unit 102 to empty the reservoir 160. For example, as discussed below, the mobile unit 102 may move to one of the docking stations 104, where condensate within the reservoir 160 may be removed via a condensate outlet of the reservoir 160. For example, at the docking station 104, a drain valve associated with the reservoir 160 may be opened, and the liquid from the reservoir 160 may exit the reservoir 160 and the conditioned space 106 via a drainage system of the docking station 104.

Additionally, components of the mobile unit 102 may generate heat while operating. For example, the HVAC equipment 134 and components of the HVAC equipment 134 may generate heat while the HVAC equipment 134 is operating. As illustrated, the mobile unit 102 may include the waste heat system 138, which may capture heat generated by the HVAC equipment 134 and/or other components of the mobile unit 102. In particular, the waste heat system 138 may include a heat box 164 in which heat from the mobile unit 102 accumulates. The heat box 164 may be an enclosed structure that includes heat conductive materials that absorb heat from outside of the heat box 164 and maintain the heat within the heat box 164. For instance, the heat box 164 may include refrigerant, heat conductive metal, such as aluminum or copper, insulation, or any combination thereof. Additionally, the walls of the heat box 164 may be constructed from, or coated with, heat-conductive material. For example, the walls of the heat box 164 may be constructed from or include metal materials such as stainless steel, aluminum, and copper to enable heat from outside of the heat box 164 to be conducted by and/or transferred to the heat box 164. Additionally, in some embodiments, the interior of the heat box 164 may include fins or other protrusions that are coupled to the walls of the heat box 164 and extend within the heat box 164. The fins or protrusions may be made from a material that is relatively more heat-conductive than the walls. For example, in an embodiment in which the walls of the heat box 164 are constructed for coated with aluminum, the fins or protrusions may be made from copper.

The heat box 164 may also include one or more sensors 166 that are communicatively coupled to the processing circuitry 120 and are configured to collect data regarding a temperature within the heat box 164. For instance, one of the sensors 166 may collect temperature data, and the processing circuitry 120 may receive the temperature data from the sensor 166 to determine the temperature within the heat box 164.

The processing circuitry 120 may monitor the temperature inside of the heat box 164 and determine when heat should be dissipated from the heat box 164. For example, the processing circuitry 120 may determine the temperature within the heat box 164 based on the data collected from the sensor 166. To determine whether heat should be dissipated from the heat box 164, the processing circuitry 120 may compare the temperature within the heat box 164 to one or more thresholds. For instance, the processing circuitry 120 may compare the temperature inside of the heat box 164 to an upper limit temperature value. As another example, the processing circuitry 120 may compare the temperature inside of the heat box 164 to an air temperature associated with the current location of the mobile unit 102. More particularly, the processing circuitry 120 may determine the air temperature based on data from a different temperature sensor that is communicatively coupled to the processing circuitry 120 and is able to collect data regarding the air surrounding the mobile unit 12.

Additionally, the processing circuitry 120 may receive the air temperature via the communication circuitry 126 from one of the docking stations 104, which, as described below, may also include a temperature sensor. For instance, when the mobile unit 102 is at one of the docking stations 104, the processing circuitry 120 may determine that the air temperature is the air temperature measured by that docking station 104. When the mobile unit 102 is not docked at one of the docking stations 104, the processing circuitry 120 may determine that the air temperature is the air temperature measured by the closest docking station 104, or, as another example, an weighted average of temperatures measured at two or more docking stations 104, with greater weight being assigned to docking stations 104 that are closest to the mobile unit 102. When the processing circuitry 120 determines that the temperature within the heat box 164 is equal to or greater than the upper limit temperature threshold and/or the air temperature of the air surrounding or nearby the mobile unit 102, the processing circuitry 120 may cause heat to dissipate heat from the heat box 164. For example, the heat box 164 may include a fan 168 that may motivate air warm air from the heat box 164 to an area outside of the heat box 164. Indeed, as described below, in response to determining that a threshold value has been exceeded, the processing circuitry 120 may cause the mobile unit 102 to move to one of the docking stations 104, which may enable heat from the heat box 164 to be dissipated to an area outside of the conditioned space 106.

The mobile unit 102 may generate power by utilizing heat generated by components of the mobile unit 102, such as the HVAC equipment 134 and/or the power system 128, via the power generation system 140. More specifically, the power generation system 140 may be or may include a thermoelectric device having two metal plates that are electrically coupled to one another. The plates may be made from the same or different metals. Generally speaking, electrical power may be generated based on heat a temperature difference between the two metal plates. For example, one of the plates may experience one temperature, while the other plate experiences another temperature. An electrical current may flow from the plate experiencing a higher temperature to the plate experiencing the lower temperature, and this electrical current may be harnessed to provide electrical power to the power system 128. For example, the power generation system 140 may include a first metal plate that is disposed within, contacts, or is located relatively nearby the heat box 164. The power generation system 140 may also include a second metal plate that is electrically coupled to the first metal plate and disposed within an area that is generally of a lower temperature than that of the first metal plate. In such an embodiment, an electric current may flow from the first metal plate to the second metal plate. Furthermore, the power generation system 140 may be coupled to the power system 128 so that the electric current generated by the power generation system 140 may be utilized to charge the power system 128. As will be appreciated, in other embodiments, the power generation system 140 may include other components configured to generate electrical power, such as photovoltaic cells, a turbine generator, or other suitable power generation components configured to use heat, light, air flow, or other resource to generate electrical power.

The ability of the mobile unit 102 to generate power that can be used to charge the power system 128 enables the mobile unit 102 to operate for longer periods of time relative to embodiments where the mobile unit 102 may be unable to charge the power system 128. For instance, while the HVAC equipment 134 is not docked at one of the docking stations 104 and is providing conditioned air, the mobile unit 102 may utilize stored electrical energy from power system 128. However, the mobile unit 102 may also generate electricity from the heat generated by the HVAC equipment 134, the power system 128, and/or other components of the mobile unit 102 by utilizing the power generation system 140. Accordingly, some of the power expended from the power system 128 to power the mobile unit 102 may effectively be recycled by converting heat energy back into electrical energy that is returned to the power system 128.

In some embodiments, heat from the heat box 164 may be utilized in conjunction with the power generation system 140. For instance, as discussed above, a metal plate of the power generation system 140 may be included with the heat box 164. As another example, a metal plate of the power generation system 140 may be included as part of the walls of the heat box 164. As a further example, the power generation system 140 may be positioned relatively near the fan 168 of the heat box 164, such that the processing circuitry 120 may cause the fan 168 to be activated to provide hot air from the heat box 164 to a metal plate of the power generation system 140, which would enable electrical power to be generated. For instance, heat may be expelled from the heat box 164 while the mobile unit 102 is away from the docking stations 104 may enable the mobile unit 102 to generate electricity to charge the power system 128.

The mobile unit 102 may also include a display 142 and input devices 144 that are communicatively coupled to the processing circuitry 120. The display 142 may display image frames, such as a graphical user interface (GUI) for an operating system or an application program interface, still images, or video content. The processing circuitry 120 may supply at least some of the image frames. For example, the processing circuitry 120 may supply image frames to display a GUI that provides a user with several selection options or types of information regarding the mobile unit 102. For example, the display 142 may provide information, among other things, regarding components of the mobile unit 102, battery life of the mobile unit 102, a mode of operation associated with the HVAC equipment 134. Moreover, in some embodiments, the display 142 may include a touch screen, which may enable users to interact with a user interface of the mobile unit 102. In such a case, the touch screen may also be part of the input devices 144. The user may utilize the input devices 144 to input user selections into the mobile unit 102. For example, the user may alter settings associated with the mobile unit 102 or enter data, information, and/or commands to cause the mobile unit 102 to move to a specific portion of the conditioned space 106 to supply conditioned air and/or dock at one of the docking stations 104.

The input devices 144 may enable users to interact with the mobile unit 102, for example, by pressing one or more buttons to interact with a GUI provided via the display 142. By utilizing the input devices 144 and the display 142, users may customize how the mobile unit 102 operates. For instance, the display 142, via a GUI, may enable users to modify settings associated with the mobile unit 102, such as times that the mobile unit 102 should or should not provide conditioned air, temperature settings associated with the HVAC equipment 134, and several other settings.

The processing circuitry 120 may receive user input made via the input devices 144, which may include the display 142 in embodiments in which the display 142 includes a touch screen, and may control operation of the mobile unit 102 based on the user input. For example, a user may enter input indicative of a request to increase or decrease a temperature of air within the conditioned space 106 or a portion of the conditioned space 106. The processing circuitry 120 may receive the user input and cause the HVAC equipment 134 to provide conditioned air of a different temperature based on the user input so that the air temperature requested by the user is present within the conditioned space 106. Indeed, in such an example, the processing circuitry 120 may cause the mobile unit 102 to move to a different location within the conditioned space 106 and provide conditioned air to the different location.

FIG. 6 also depicts an embodiment of the docking station 104. As illustrated, the docking station includes processing circuitry 180, memory 182, storage 184, communication circuitry 186, sensors 188, a display 190, input devices 192, and connections 194. The various components of the docking station 106 may include hardware elements, such as circuitry, software elements, such as a tangible, non-transitory computer-readable medium storing instructions, or a combination of both hardware and software elements. It should be noted that the various depicted components may be combined into fewer components or separated into additional components. For example, the memory 182 and the storage 184 may be included in a single component. Moreover, in addition to the processing circuitry 180, various components of the mobile unit 102 may include their own processing circuitry.

As depicted, the processing circuitry 180 is operably coupled with the memory 182 and the storage 184. Thus, the processing circuitry 180 may execute instructions stored in the memory 182 and/or the storage 184 to perform operations, such as controlling movement of the mobile unit 102, as well as heating and cooling operations performed via the HVAC equipment 134. As such, the processing circuitry 180, which may act as a central controller for the HVAC system 100, may include one or more general purpose microprocessors, one or more application specific integrated circuits (ASICs), one or more field programmable logic arrays (FPGAs), or any combination thereof. The instructions on the storage 184 that the processing circuitry 180 may execute may include an application 196 that enables to the processing circuitry 180 to perform functions described below. For example, the application 196 may be executed to control the movement of the mobile unit 102 as well as operations performed by the mobile unit 102.

In addition to instructions, the memory 182 and/or the storage 184 may store data to be processed by the processing circuitry 180. Thus, in some embodiments, the memory 182 and/or the storage 184 may include one or more tangible, non-transitory, computer-readable mediums. For example, the memory 182 may include random access memory (RAM), and the main memory storage 184 may include read only memory (ROM), rewritable non-volatile memory such as flash memory, hard drives, optical discs, and/or the like.

As depicted, the processing circuitry 180 is also operably coupled with the communication circuitry 186. In some embodiments, the communication circuitry 186 may facilitate data communication with another electronic device and/or a communication network. For example, the communication circuitry 186, which may be a radio frequency system, may enable the mobile unit 102 to communicatively couple to a personal area network (PAN), such as a Bluetooth network, or a local area network (LAN), such as an 802.11x Wi-Fi network. Additionally, the communication circuitry 186 may enable the docking station 104 to communicatively couple to the mobile unit 102, as well as users' electronic devices, such as mobile phones, tablets, or computers.

The docking station 104 may include several types of sensors 188 that are communicatively coupled to the processing circuitry 180 and used to collect different types of data. For instance, the docking station 104 may include a temperature sensor and a humidity sensor that respectively collect data regarding air temperature and air humidity near the docking station 104. The processing circuitry 180 may utilize the collected data to determine the air temperature and humidity. Furthermore, the docking station 104 may include light intensity sensors, infrared sensors, or other sensors that may utilized to detect occupancy within the conditioned space 106. For example, the sensors 188 of the docking station 104 may detect whether there is light or heat in a given area or zone of the conditioned space 106. Similarly, the sensors 188 may emit ultrasonic sound waves and/or electromagnetic radiation, such as microwaves or radio waves, the sensors 188 may detect reflected waves, and the processing circuitry 180 may determine occupancy based on shifts in wavelength or frequency of the received waves relative to the emitted waves. The processing circuitry 180 of the docking station 104 may determine whether an area associated with the docking station 104 is occupied based on the collected sensor data. For example, a light sensor collecting data indicating that a light is on may be utilized in conjunction with temperature data and/or data detected by an infrared sensor to determine whether the area of the conditioned space 106 is occupied. Alternatively, the processing circuitry 180 of the docking station 104 may determine occupancy based on data from each type of sensor independently.

The docking station 104 may also include a display 190 and input devices 192 that are communicatively coupled to the processing circuitry 180. The display 190 may display image frames, such as a graphical user interface (GUI) for an operating system or an application program interface, still images, or video content. The processing circuitry 180 may supply at least some of the image frames. For example, the processing circuitry 180 may supply image frames to display a GUI that provides a user with several selection options or types of information regarding the mobile unit 102. For example, the display 190 may provide information, among other things, regarding components of the mobile unit 102, battery life of the mobile unit 102, a mode of operation associated with the HVAC equipment 134. Additionally, the display 190 may provide information regarding air settings such as temperature and humidity, desired air settings such as a desired temperature and/or desired humidity. Moreover, in some embodiments, the display 190 may include a touch screen, which may enable users to interact with a user interface of the docking station unit 104. In such a case, the touch screen may also be part of the input devices 192. The user may utilize the input devices 192 to input user selections into the docking station 104. For example, the user may alter settings associated with the mobile unit 102 or enter data, information, and/or commands to cause the mobile unit 102 to move to a specific portion of the conditioned space 106 to supply conditioned air and/or dock at the docking station 104.

The input devices 192 may enable users to interact with the docking station 104, for example, by pressing one or more buttons to interact with a GUI provided via the display 190. By utilizing the input devices 192 and the display 190, users may customize how the mobile unit 102 operates. For instance, the display 190, via a GUI, may enable users to modify settings associated with the mobile unit 102, such as times that the mobile unit 102 should or should not provide conditioned air, temperature settings associated with the HVAC equipment 134, and several other settings.

The connections 194 include several components of the docking station 104 that may be connected to, or interface with, the mobile unit 102 when the mobile unit 102 is docked at the docking station 104. When the mobile unit 102 is docked at the docking station 104, the mobile unit 102 may be described as having a "docking relationship" with the docking station 104. Similarly, the mobile unit 102 may be said to be docked at a docking station when the mobile unit 102 or a component thereof is coupled to, or interfaces with, the connections 194 of the docking station 104. For instance, the connections 194 may include a power source 212 that may supply the mobile unit 102 with electrical power. The power source 212 may include an electrical outlet connected to a utility power source. The connections 194 may also include a door 214 or other access panel that may be formed in a wall. As described below, the heat box 164 may open to enable heat from the heat box 164 to be dissipated to an environment outside of the conditioned space 106. Furthermore, the connections 194 may include a drain 216 that interfaces with a drain of the mobile unit 102 to enable liquid stored in the reservoir 169 to be transferred to the outside environment.

Figure 7:
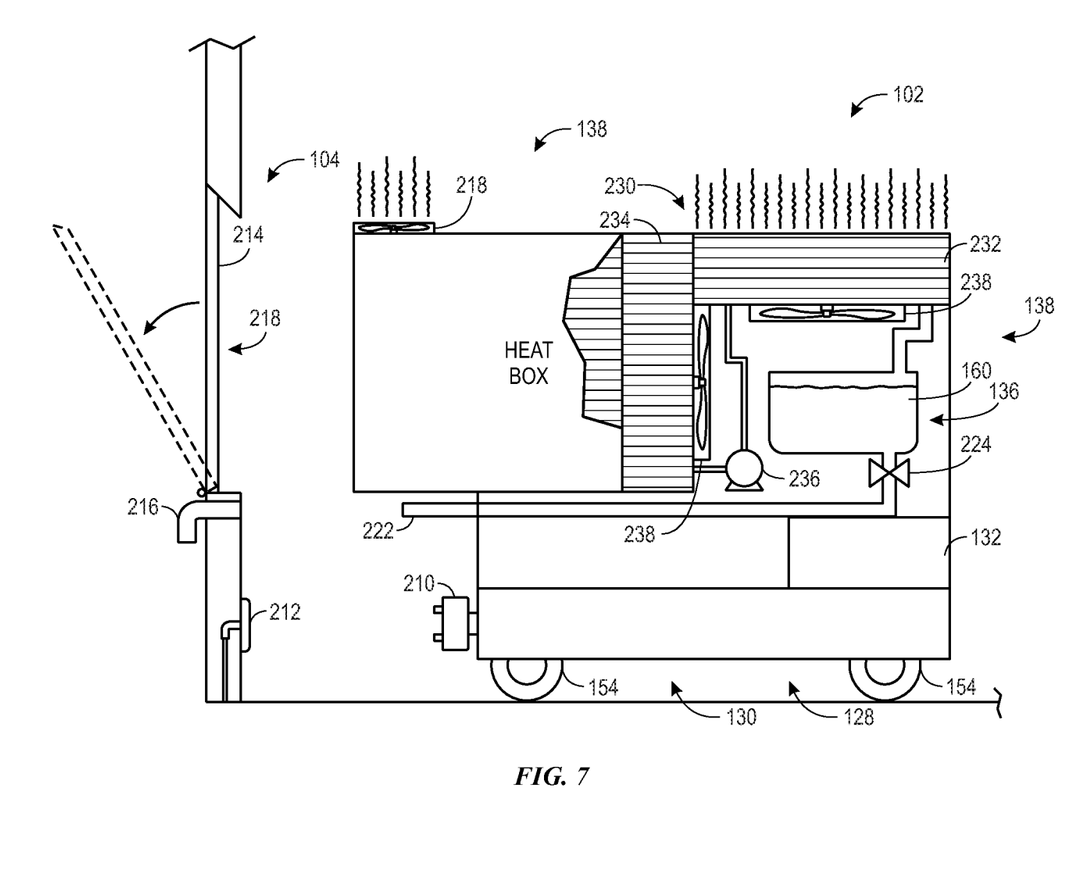
FIG. 7 is a side view of an embodiment of the mobile unit and an embodiment of the docking station of FIG. 5, in accordance with aspects of the present disclosure.

Keeping the discussion of FIG. 6 in mind, FIG. 7 is a side view of an embodiment of the mobile unit 102 and the docking station 104. In particular, FIG. 7 illustrates alignment of components of the mobile unit 102 with components of the docking station 104, for example, to provide electrical power to the mobile unit 102, to enable heat to be dissipated from the mobile unit 102, and/or to enable condensate to be drained from the reservoir 160 when the mobile unit 102 is docked at the docking station 104. For instance, regarding power, the power system 128 of the mobile unit 102 may include a connector 210 that is configured to couple to a power source 212 of the docking station 104 when the mobile unit 102 is docked. For instance, the power source 212 may include an electrical outlet connected to a utility power source. When coupled to the power source 212, the power system 128 of the mobile unit 102 is provided with electrical power, which may be utilized to charge the power system 128 and/or provide electrical power to the mobile unit 102 for operating one or more components of the mobile unit 102 while the mobile unit 102 is docked.

As illustrated, the docking station 104 may also include a door 214 or other access panel, which may be formed in a wall or other panel of the conditioned space 106. When moving into a docked position with the docking station 104, the heat box 164 of the waste heat system 138 may press against the door 214 to bias the door open. In particular, the door 214 may rotate or pivot into enter a space 218 formed in the wall of the conditioned space 106, and the heat box 164 may at least partially enter and occupy the space 218. In other words, the heat box 164 may be positioned within the space 218 external to the conditioned space 106 when the mobile unit 102 is docked in the docking station 104. When the heat box is in the space 218, the processing circuitry 120 may cause a vent 220 of the heat box 164 to be opened to enable hot air to escape from the heat box 164. For example, the hot air may enter the space 218 to be directed into an external environment or other area fluidly coupled to the space 218 and/or separate from the conditioned space 106.

Moreover, the docking station 104 may include a drain 216 that interfaces with a drain 222 of the mobile unit 102. For example, as illustrated, the drain 222 of the mobile unit 102 may be fluidly coupled to the reservoir 160 of the drainage system 136. When docked at the docking station 104, the drain 216 of the docking station 104 and the strain 222 of the mobile unit 102 may be coupled with one another. In this configuration, the processing circuitry 120 may cause a valve 224 of the mobile unit 102 to be opened, for example via an actuator, to enable water or other liquid to exit the reservoir 160 and enter the drain 216 of the docking station 104. The liquid that enters the drain 216 may exit from the drain 216 into another suitable location, such as an external environment.

Additionally, FIG. 7 illustrates components of the HVAC equipment 134 of the mobile unit 102. For example, the HVAC equipment 134 includes a refrigeration circuit 230 that includes heat exchangers 232, 234 and a compressor 236 which may motivate refrigerant throughout the refrigerant circuit 230, generally in the same manner as described above with respect to FIG. 4. Additionally, HVAC equipment 134 includes fans 238 which may operate to intake air into the mobile unit 102 for conditioned and which may provide conditioned air to the conditioned space 106.

Figure 8:
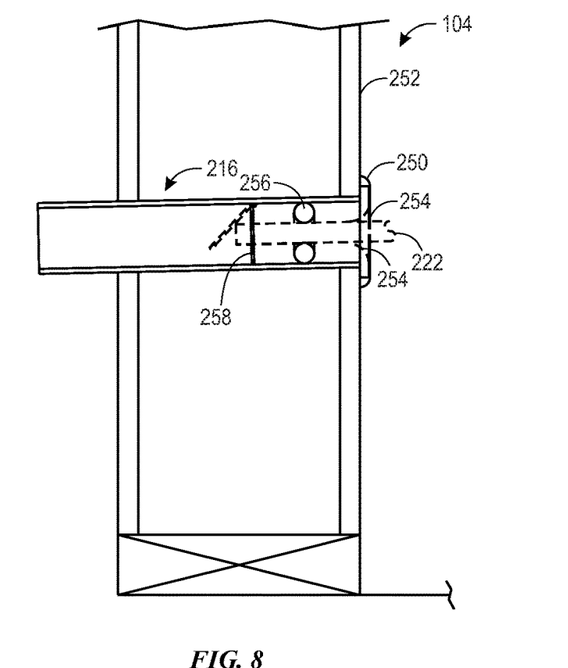
FIG. 8 is a side view of an embodiment of a drain of the docking station of FIG. 5, in accordance with aspects of the present disclosure.

To help expand on the discussion of the drain 216, FIG. 8 is a side view of an embodiment of the drain 216 of the docking station 104. As illustrated, the drain 216 includes an outer portion 250 that may extend from a wall 252 of the interior of the conditioned space 106. The outer portion 250, as illustrated, includes flaps 254 that may bend into the drain 216 when biased by the drain 222 of the mobile unit 102 docked with the docking station 104. The flaps 254, which may cover or occlude an inlet of the drain 216 when unbiased, are pliable to enable the drain 222 of the mobile unit 102 to fit with or within the drain 216 of the docking station 104 when the mobile unit 102 is docked. The drain 222 may extend into the wall 252 and pass through one or more gaskets 256 which help prevent condensate or other liquid from the mobile unit 102 from escaping into a portion of the drain 216 positioned relatively near the interior of the conditioned space 106. The drain 216 also includes a trap door 258 that opens when contacted or biased by the drain 222 of the mobile unit 102. Once the trap door 258 is open, fluid from the reservoir 160 of the mobile unit 102 may be drained into the drain 216 of the docking station 104, exit the conditioned space 106, and enter the external environment. For example, when the trap door 258 is open, the valve 224 of the mobile unit 102 may be actuated to release liquid from the reservoir 160 of the mobile unit 102 to drain the liquid into the drain 216 of the docking station 104.

Figure 9:
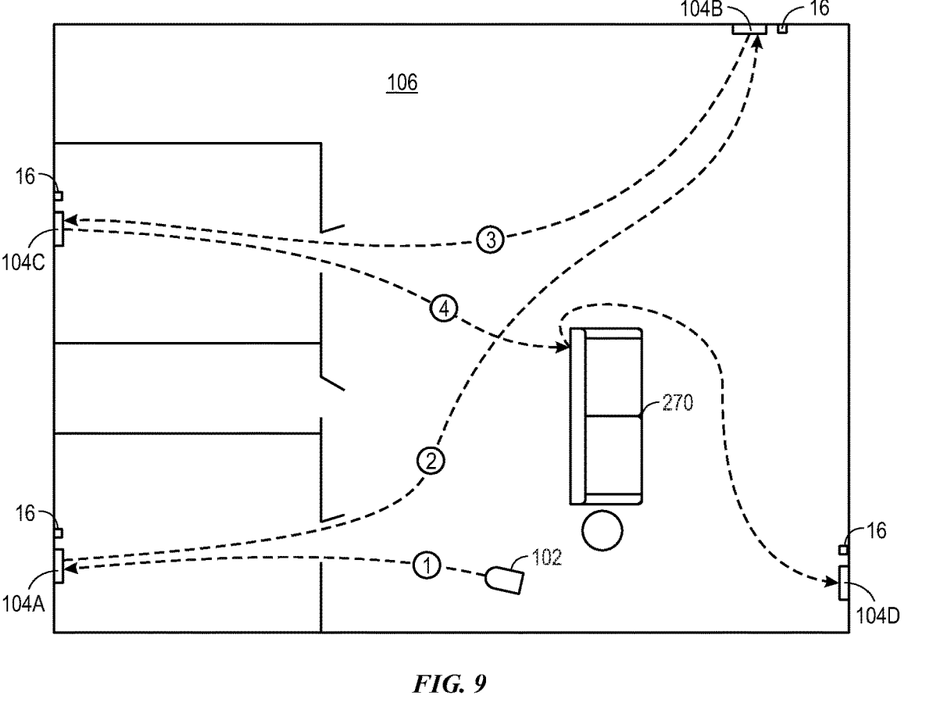
FIG. 9 is a plan view schematic of a conditioned space, illustrating movement of the mobile unit of FIG. 5 within the conditioned space, in accordance with aspects of the present disclosure.

Continuing with the drawings, FIG. 9 is a plan view of the conditioned space 106, illustrating movements of the mobile unit 102 within the conditioned space 106. As illustrated, the mobile unit 102 may be positioned within an area, such as a living room, of the conditioned space 106. The mobile unit 102 may provide conditioned air while positioned away from the docking station 104. For instance, the mobile unit 102 may provide heated or cooled air based on instructions received from the control device 16 within the conditioned space 106, received from the docking station 104, or from determinations made based on data received by the control device 16 or docking station 104.

Additionally, the mobile unit 102 may move about the conditioned space 106 based on communications with docking stations 104 and/or the control devices 16. For instance, the control devices 16, which may be thermostats and may include temperature sensors, may determine air settings such as, but no limited to, temperature and humidity for the conditioned space 106. The control devices 16 may also determine whether air with the determined air settings is provided within the vicinity of the control devices 16. Similarly, the docking stations 104 may include temperature sensors and communication circuitry which respectively enable the docking stations 104 to measure an ambient temperature and communicate with other docking stations 104, control devices 16, and the mobile unit 102. Accordingly, the docking stations 104 and control devices 16 may determine that air in a given area of the conditioned space 106 has air settings that differ with air that is desired in the conditioned space 106. In response, one or more control devices 16, one or more docking stations 104, or a combination thereof, may send a command to the mobile unit 102 to move to a particular location within the conditioned space 106 and operate to provide conditioned air at the desired conditions. For instance, docking stations 104 may issue a call for conditioning of air in an area of the conditioned space 106 that is associated with a particular docking station 104 to cause the mobile unit 102 to move to the particular docking station 104.

Furthermore, the docking stations 104 and/or control devices 16 may include light intensity sensors, infrared sensors, or other sensors that may utilized to detect occupancy within the conditioned space 106. For example, the sensors of docking stations 104 and/or control devices 16 may detect whether there is light or heat in a given area or zone of the conditioned space 106. Similarly, the sensors may emit ultrasonic sound waves and/or electromagnetic radiation, such as microwaves or radio waves, the sensors may detect reflected waves, and processing circuitry associated with the docking stations 104 and/or control devices 16 may determine occupancy based on shifts in wavelength or frequency of the received waves relative to the emitted waves. The processing circuitry of the docking stations 104 and/or control devices 16 may determine whether an area associated with a particular docking station 104 or control device 16 is occupied based on the collected sensor data. For example, a light sensor collecting data indicating that a light is on may be utilized in conjunction with temperature data and/or data detected by an infrared sensor to determine whether the area of the conditioned space 106 is occupied. Alternatively, the processing circuitry of the docking station 104 and/or control devices 16 may determine occupancy based on data from each type of sensor independently.

Moreover, the mobile unit 102 may also determine when and whether to move to a different location within the conditioned space 106. For example, the processing circuitry 120 of the mobile unit 102 may determine that the mobile unit 102 should proceed to one of the docking stations 104 to recharge, release heat stored in the waste heat system 138, drain condensate from the reservoir 160 of the drainage system 136, or a combination thereof. For example, the processing circuitry 120 of the mobile unit 102 may determine that the mobile unit 102 should move to the docking station 104 to charge to the power system 128 upon a determination that an estimated battery life of the power system 128 is less than a threshold amount and/or that a charge of the power system 128 is less than a threshold amount of charge. As another example, the processing circuitry 120 may determine that the mobile unit 102 should move to one of the docking stations 104 upon a determination that a temperature within the heat box 164 is above a threshold temperature based on the data from one or more of the sensors 166 associated with the heat box 164. As yet another example, the processing circuitry 120 may determine that the mobile unit 102 should move one of the docking stations 104 upon a determination that the amount of condensate within the reservoir 160 has exceeded a threshold amount based on the level sensor 162 of the drainage system 136.

Bearing this in mind, at a first time, the mobile unit 102 may move to a first docking station 104a that is located within a specific portion of the conditioned space 106, such as a bedroom. For example, in response to determining that the mobile unit 102 should recharge, release excess heat, drain the reservoir 160, or a combination thereof, the processing circuitry 120 may determine that the mobile unit 102 should move to one of the docking stations 104. The processing circuitry 120 may also determine to which docking station 104 the mobile unit 102 should move. For instance, utilizing a map of the conditioned space 106 that may be stored on the mobile unit 102, the processing circuitry 120 may determine that the mobile unit 102 should move to the first docking station 104a because first docking station 104a is that docking station 104 that is located nearest the mobile unit 102. The mobile unit 102 may subsequently move, utilizing the drive system 130 and the navigation system 132, to the first docking station 104a to charge the power system 128, release heat from the waste heat system 138, and/or release condensate from the reservoir 160.

At another time, such as while the mobile unit 102 is docked at the first docking station 104a, the mobile unit 102 may receive a command to move to a second docking station 104b. For example, one of the control devices 16 or docking stations 104, which may be located within the conditioned space 106, may determine that the conditioned air should be supplied to portion of the conditioned space 106 associated with the second docking station 104b. Accordingly, the mobile unit 102 may leave the first docking station 104a and travel to the second docking station 104b. Upon docking at the second docking station 104b, the mobile unit 102 may provide conditioned air in accordance with air settings determined by one or more of the control devices 16 and/or one or more of the docking stations 104. Alternatively, the mobile unit 102 may move towards the second docking station 104b but supply conditioned air without docking at the second docking station 104b.

As time passes, the air settings associated with the portion of the conditioned space 106 near the second docking station 104b may meet, or become similar to, the air settings determined by one or more of the control devices 16. The control devices 16 and/or docking stations 104 may determine that the mobile unit 102 should be deployed to a different area in the conditioned space 106 to provide conditioned air. For example, one or more of the control devices 16 and/or docking stations 104 may determine a priority associated with various areas or zones of the conditioned space 106. The priorities may be determined based on several factors, such as, but not limited to, occupancy, a user-selected preference, a difference between a temperature setting associated with the zone and an air temperature that should be present in the area or zone, or a combination thereof. For instance, the control devices 16 and/or second docking station 104b may send a command to the mobile unit 102 to move to a third docking station 104c and provide conditioned air to an area of the conditioned space 106 associated with the third docking station 104c, such as a bedroom.

As another example, one or more of the control devices 16 and/or docking stations 104 may send a command to the mobile unit 102 to move to a fourth docking station 104d. For example, the fourth docking station 104d may be associated with another area of the conditioned space 106, such as a kitchen or living room. Accordingly, the mobile unit 102 may move towards to the fourth docking station 104d. However, along the way to the fourth docking station 104d, the mobile unit 102, such as via the sensors 156 of the navigation system 132, may determine that an object, such as an article of furniture 270, is in the path of the mobile unit 102 toward the fourth docking station 104d. Upon receiving data from the sensors 156 indicating the presence of the article of furniture 270, the processing circuitry 120 may cause the mobile unit 102 to move towards the fourth docking station 104d with a different path to avoid the article of furniture 270. For example, the processing circuitry 120 may direct the drive system 130 to cause the mobile unit 102 to navigate around the article of furniture 270 to provide the mobile unit 102 with an unobstructed path to the fourth docking station 104d.

While FIG. 9 is discussed above with respect to a single mobile unit 102, it should be noted that in other embodiments, more than one mobile unit 102 may be employed within the conditioned space 106. When more than one mobile unit 102 is utilized, one or more of the control devices 16 and/or docking stations 104 may determine a location for each of the mobile units 102. When two mobile units 102 are present, the control devices 16 and/or docking stations 104 may command the mobile units 102 to move to the areas within the conditioned space 106 that have the two highest priorities. When one or more of the priorities change, the control devices 16 and/or docking stations 104 may command one or more of the mobile units 102 to move to other docking stations 104 or areas within the conditioned space 106. For instance, if a first zone has a first priority and a second zone has a second priority, the mobile units 102 may be assigned to the first and second zones of the conditioned space 106 to provide conditioned air. As conditioned air is supplied, a third zone may later have the second priority, and/or the third zone may have a third priority. In such a case, one or more of the control devices 16 and/or docking stations 104 may send a command to cause the mobile unit 102 in the second zone to move to the third zone to supply conditioned air.

It should also be noted that the mobile unit 102 may be controlled in other manners than those described above. For example, in some cases, the docking stations 104, control devices 16, or both may be associated with an application, such as a mobile application that is executable on an electronic device, such as a mobile phone, computer, or tablet computing device. Utilizing the application, a user may select where to send the mobile unit 102 within the conditioned space 106 to provide conditioned air, and the electronic device may communicate with the mobile unit 102 to command the mobile unit 102 to be deployed to the area selected by the user via the application being executed on the electronic device.

Furthermore, while the discussion above indicates that the conditioned space 106 may include control devices 16, such as thermostats, it should be noted that the presently disclosed techniques may be employed without the use of any control devices 16. For example, docking stations 104, as described above, may include the processing circuitry 180 and the sensors 188 that may be used to perform operations that may be performed by the control device 16 of a centralized HVAC system.

Accordingly, the present disclosure is directed to a mobile unit that is configured to move around a conditioned space to supply conditioned air to the conditioned space. Additionally, the present disclosure is directed to docking stations that the mobile unit may dock at to receive electrical power, release excess heat, and release condensate stored by a reservoir of the mobile unit 102. As such, the presently disclosed techniques may be utilized to supply to conditioned air to spaces that do not include built-in HVAC systems.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
   a docking station of a plurality of docking stations; and
   a mobile air conditioning unit configured to dock with the docking station of the plurality of docking stations, wherein the mobile air conditioning unit includes a refrigerant circuit configured to condition an airflow to produce a conditioned airflow and a transportation system configured to autonomously relocate the mobile air conditioning unit, wherein the refrigerant circuit and the transportation system are packaged together in the mobile air conditioning unit, and wherein the docking station of the plurality of docking stations comprises at least one outlet configured to receive a fluid from the mobile air conditioning unit.

2. The HVAC system of claim 1, wherein the mobile air conditioning unit includes processing circuitry configured to communicate with the docking station of the plurality of docking stations.

3. The HVAC system of claim 2, wherein the processing circuitry is configured to receive feedback from the docking station of the plurality of docking stations and regulate operation of the transportation system based on the feedback.

4. The HVAC system of claim 1, wherein the docking station includes a sensor configured to detect a temperature, humidity, occupancy, light intensity, or a combination thereof, in a room of a building.

5. The HVAC system of claim 1, wherein the transportation system includes a motor and a plurality of rollers, wherein the motor is configured to drive at least one roller of the plurality of rollers to autonomously relocate the mobile air conditioning unit.

6. The HVAC system of claim 1, comprising an input device configured to receive a target climate setting, wherein the input device is configured to send a command to the mobile air conditioning unit to cause the mobile air conditioning unit to move to the docking station of the plurality of docking stations.

7. The HVAC system of claim 6, wherein the command is based on a difference between a target temperature of the target climate setting and a temperature measured by the docking station.

8. The HVAC system of claim 1, wherein the docking station of the plurality of docking stations includes a power source configured to supply the mobile air conditioning unit with electrical power.

9. The HVAC system of claim 1, wherein the fluid is air stored in a heat box of the mobile air conditioning unit.

10. The HVAC system of claim 1, wherein the fluid is condensate stored in a reservoir of the mobile air conditioning unit.

* * * * *